UNITED STATES PATENT OFFICE.

GERHARD NICOLAAS VIS, OF PARIS, FRANCE.

MANUFACTURE OF SODIUM CARBONATE AND AMMONIUM SULFATE FROM BISULFATE OF SODA.

1,294,526.     Specification of Letters Patent.     Patented Feb. 18, 1919.

No Drawing.     Application filed September 21, 1917. Serial No. 192,511.

*To all whom it may concern:*

Be it known that I, GERHARD NICOLAAS VIS, chemist, of 10 Rue de Vienne, Paris, France, have invented a new and useful Improvement in the Manufacture of Sodium Carbonate and Ammonium Sulfate from Bisulfate of Soda, which improvement is fully set forth in the following specification.

Sodium bisulfate, as a residue of the manufacture of nitric acid, has always been considered as a cumbersome by product without commercial value.

It is true that a portion of the bisulfate produced has been utilized in the manufacture of sodium sulfate and hydrochloric acid by the aid of sodium chlorid and heat but the products resulting from this operation have such small commercial value that many nitric acid works throw the sodium bisulfate away.

This invention allows the two components of the sodium bisulfate to be utilized by transforming the sodium component into carbonate or hydrate and the sulfuric acid component into ammonium sulfate. The final products are therefore of great commercial value which is not the case in processes already proposed.

The process may be summarized as follows:

The sodium bisulfate (which may have been previously treated with water) is placed in contact with water and ammonia, is then introduced in sufficient quantity to neutralize free sulfuric acid and thereupon in an excess according to the quantity of sodium sulfate present. The mixture of ammonium sulfate, sodium sulfate and free ammonia is then heated with carbonic acid until saturation is complete. Ammonium bicarbonate is produced which by double decomposition with a portion of the sodium sulfate forms sodium bicarbonate and ammonium sulfate. The ammonium sulfate enters into solution while the sodium bicarbonate is precipitated. This latter product is separated from the ammonium sulfate by drying and washing and it is transformed by known means into sodium carbonate (Solvay's soda) or into caustic soda.

The mother liquors after neutralization of the resulting ammonium bicarbonate with sodium bisulfate or aqueous extracts of crude bisulfate are subjected to methodical crystallization which allows both a portion of the undecomposed sodium sulfate to be recovered and also the ammonium sulfate; the sodium sulfate is again employed in the reaction with fresh quantities of sodium bisulfate, and the ammonium sulfate is dried and then represents commercial ammonium sulfate.

It is true that the reaction which is the basis of the Solvay process, that is to say the separation of the sodium of a sodium salt in the form of sodium bicarbonate has already been proposed for sodium nitrate and sulfate, but it has never been proposed or commercially carried out for sodium bisulfate. It has never received commercial application with sodium sulfate, very probably because the separation of untransformed sodium sulfate and of the ammonium sulfate presents certain difficulties. These difficulties are also overcome by the process in conformity with this invention.

It is obvious that the sodium bisulfate to be treated will not always have the same composition and also that the proportion between the sodium and ammonium sulfates as well as the quantity of water employed may be varied.

The following example is given by way of illustration:

500 grams of sodium bisulfate consisting of 80.6 grams of sulfuric acid and 419.4 grams of sodium sulfate are dissolved in 922.6 grams of water.

There is then introduced 111.8 grams of gaseous ammonia of which 27.9 grams are employed to neutralize the 80.6 grams of sulfuric acid and 83.9 grams in the formation of the bicarbonate.

After a delay of about four hours 208.5 grams of dry carbonic acid gas are introduced i. e. 96% of the theoretical quantity necessary.

The temperature which was at the commencement about 30° C. rises to 50° C. and comes down toward the end of the reaction to 30° C. The carbonic acid is introduced under a slight pressure, equivalent for example to a column of water a few centimeters high. The product of the reaction is then filtered and dried at a temperature of 30° C. and 1204 grams of liquid (mother liquor) and 533 grams of a solid product are obtained.

The solid product is composed of sodium bicarbonate moistened with mother liquor.

By washing this product with a concentrated solution of sodium bicarbonate and drying, pure sodium bicarbonate is obtained which after roasting yields 173.7 grams of pure carbonate.

As the 419.4 grams sodium sulfate (contained in the 500 grams bisulfate) should have yielded 313.1 grams of carbonate, the yield so far as the sodium sulfate is concerned is 55.5%.

On the other hand the 83.9 grams of ammonia present in the form of free ammonia should have yielded 261.6 grams of sodium carbonate. The yield as regards ammonia is therefore 66.4%.

This result is very satisfactory and may be improved by introducing the carbonic acid under pressure. The result depends mainly as regards the yield of the sodium sulfate, on the quantity of ammonia employed and as regards the yield of sodium bicarbonate by the ammonia, on the quantity of sodium sulfate in excess. It is indeed the more satisfactory as it proves that the formation of the sodium bicarbonate is in no wise impeded by the presence of considerable quantities of ammonium sulfate, a fact which could not at all be foreseen. Equilibrium between the different salts—sodium sulfate, ammonium sulfate, sodium bicarbonate, ammonium bicarbonate—might have been influenced disadvantageously (as regards the formation of sodium bicarbonate) by the presence of considerable quantities of ammonium sulfate. The experiment just described proves that this is not the case, the result has been moreover confirmed by a series of similar and comparative experiments.

The mother liquors of the sodium bicarbonate of the experiment in question, contained per 100 grams of water: 15.4 grams sodium bicarbonate, 52.2 grams ammonium sulfate and 9.8 grams sodium sulfate. Their composition may alter according to the acidity of the sodium bisulfate and the quantity of ammonia employed. However this may be, these solutions as such or after neutralization will always on cooling or after concentration deposit a double salt of the composition:

$$Na_2SO_4 + (NH_4)_2SO_4 + 4H_2O.$$

The sodium sulfate cannot be successfully separated from the ammonium sulfate by mere crystallization, because there is always a tendency to the formation of the double salt.

This separation however takes place very easily by causing ordinary crystalline sodium sulfate ($Na_2SO_4 + 10H_2O$) to be formed.

This may be effected by diluting the neutralized solutions and by cooling them to 0° C. or below.

The proportion between the quantities of water, sodium sulfate and ammonium sulfate which are the only constituents of these solutions (when neutralized and freed in any suitable manner from alkaline salts) may vary greatly. Crystallization of about two thirds of the sodium sulfate in the form of $Na_2SO_4 + 10H_2O$ present in the solution is obtained by diluting to such a point that there is say 15 grams of sodium sulfate per 100 grams of water and by cooling below 0° C.; the whole of the ammonium sulfate remains in solution even if this quantity rises to double the quantity of sodium sulfate present in the original solution.

By concentrating these solutions (deprived in this manner of the greater quantity of their sodium sulfate content) either in vacuo or over a naked fire, pure ammonium sulfate is deposited while the sodium sulfate remains in solution at temperatures above 50° C. The solutions thus obtained are enriched in sodium sulfate and again treated as above described.

This description of the process is by way of illustration only; the principles of the invention give rise to several variations especially as regards the treatment of the crude sodium bisulfate with water and which thus gives a solution rich in sulfuric acid and poor in sodium sulfate, side by side with a salt rich in sodium sulfate and poor in acid.

The solution rich in sulfuric acid is neutralized with ammonia and the sodium sulfate and the ammonium sulfate separated as above described. The mother liquors serve with the salt rich in sodium sulfate for the manufacture of the sodium bicarbonate and of the ammonium sulfate as set out.

Claims:

1. A process for the manufacture of sodium carbonate and ammonium sulfate from sodium bisulfate which consists in dissolving the latter in water, treating with ammonia and then admitting carbonic acid under a slight pressure until saturation is complete.

2. In a process for the manufacture of sodium carbonate and ammonium sulfate from sodium bisulfate treated with water, ammonia and carbonic acid, washing the sodium bicarbonate, so produced, with a concentrated solution of sodium bicarbonate and then drying.

3. In a process for the manufacture of sodium carbonate and ammonium sulfate from sodium bisulfate treated with water, ammonia and carbonic acid, the steps consisting in diluting the mother liquor from which the sodium bicarbonate has been separated to a point at which sodium sulfate will crystallize at 0° C., then cooling the diluted liquor to 0° C. to crystallize sodium sulfate therefrom and then evaporating the remaining liquor to recover the ammonium sulfate.

In testimony whereof I have signed this specification in the presence of two subscribing witnesses.

GERHARD NICOLAAS VIS. [L. S.]

Witnesses:
  JOHN F. SIMONS,
  GASTON DE MESTRA.

Copies of this patent may be obtained for five cents each, by addressing the "Commissioner of Patents, Washington, D. C."